Oct. 14, 1952 — L. A. PHILIPP — 2,613,509
REFRIGERATING APPARATUS
Filed Sept. 22, 1948 — 12 Sheets-Sheet 3

Fig. 4

INVENTOR.
LAWRENCE A. PHILIPP
BY Ralph E. Baker
ATTORNEY

Oct. 14, 1952          L. A. PHILIPP          2,613,509

REFRIGERATING APPARATUS

Filed Sept. 22, 1948          12 Sheets-Sheet 5

INVENTOR.
LAWRENCE A. PHILIPP
BY
Ralph E. Baker
ATTORNEY

Oct. 14, 1952 — L. A. PHILIPP — 2,613,509
REFRIGERATING APPARATUS
Filed Sept. 22, 1948 — 12 Sheets-Sheet 6

INVENTOR.
LAWRENCE A. PHILIPP
BY Ralph E. Baker
ATTORNEY

Oct. 14, 1952 — L. A. PHILIPP — 2,613,509
REFRIGERATING APPARATUS
Filed Sept. 22, 1948 — 12 Sheets-Sheet 8

INVENTOR.
LAWRENCE A. PHILIPP
BY Ralph E. Baker
ATTORNEY

Oct. 14, 1952 L. A. PHILIPP 2,613,509
REFRIGERATING APPARATUS
Filed Sept. 22, 1948 12 Sheets-Sheet 9

INVENTOR.
LAWRENCE A. PHILIPP
BY Ralph E. Baker
ATTORNEY

Patented Oct. 14, 1952

2,613,509

UNITED STATES PATENT OFFICE 2,613,509

REFRIGERATING APPARATUS

Lawrence A. Philipp, Detroit, Mich., assignor to Nash-Kelvinator Corporation, Detroit, Mich., a corporation of Maryland Application September 22, 1948, Serial No. 50,472

3 Claims. (Cl. 62—103)

This invention relates generally to refrigerating apparatus and more particularly to household type refrigerators.

It is a general object of the invention to provide an improved two door refrigerator having a freezing compartment and a cooling compartment closed by separate external cabinet doors.

Another object of the invention is to provide an improved refrigerator having a cabinet of the above mentioned character in cooperation with a primary-secondary refrigerating system for cooling the compartments.

Another object of the invention is to provide in a refrigerator having a freezing compartment and insulated cabinet walls, an improved construction and arrangement to prevent collection of frost in the cabinet insulation, adjacent the freezing compartment.

Another object of the invention is to provide in a two door refrigerator of the type having separate food storage and freezing compartments, an improved construction and arrangement for preventing condensation on the outer front surface of the cabinet between spaced, adjacent edges of the doors.

Another object of the invention resides in a refrigerator cabinet door so constructed as to induce moisture laden room air which leaks thereinto to condense and drain therefrom upon defrosting of the refrigerator system.

Another object of the invention is to provide an improved refrigerator cabinet framework including a base and front wall frame for reinforcing a cabinet casing and for supporting compartment liners.

Another object of the present invention is to provide an improved refrigerator cabinet which is light in weight without sacrificing the desired sturdiness and rigidity required of such cabinets.

Another object of the invention is to provide a refrigerator cabinet of an improved structural character to reduce its cost and to facilitate its assembly.

Another object of the invention is to provide a refrigerator having an improved arrangement for supporting compartment forming members and for supporting the units of the refrigerating system.

Another object of the invention is to provide in a refrigerator having separate freezing and food storage compartments, an improved arrangement of a freezing compartment forming container and of a refrigerant evaporator to obtain efficient heat conductive relationship therebetween.

Another object of the invention is to provide in a refrigerator having a freezing compartment, an improved freezing compartment construction to prevent wetting of the cabinet wall insulation.

Another object of the invention is to provide a refrigerator having a freezing compartment embodying the above mentioned features including removability of the freezing compartment evaporator from the refrigerator cabinet without need of disconnecting conduit lines of the system.

In the drawings:

Fig. 3 is an enlarged front view of the refrigerator having parts broken away and in section to show certain features of the invention;

Referring to the drawings and first to Figs. 1 to 16 inclusive, there is shown a household type of refrigerator having a cabinet, designated generally by the numeral 20. The cabinet 20 comprises, in general, a casing 22, a casing reinforcing frame 24, a liner or spacer 26, and a second liner or shell 28. The frame 24 is an upright structure which is supported by and within the casing 22 at the front of the cabinet and in turn supports the liners 26, 28. These liners 26 and 28 are supported by the frame 24 in vertical spaced relationship within the casing 22; the liner 26 being disposed immediately above the liner 28. Interposed between the casing 22 and the liners 26, 28 is heat insulation 30 which may be of any of the suitable well-known types for decreasing heat leakage into the interior of the cabinet. Also, heat insulation 32 is provided between the adjacent bottom and top walls respectively of the liners 26 and 28, extending to the cabinet upright walls as a partition to decrease heat exchange between the liners.

The liner 26 retains the insulation 30 in place and defines a freezing or low temperature evaporator compartment 34 in the upper region of the cabinet. Adjacent the bottom of the cabinet, a horizontal partition 36 is provided which cooperates with an upper portion of the liner 28 to form a food storage compartment 38 and cooperates with a lower portion of the liner 28 to form a high humidity compartment 40. The high humidity compartment 40 is provided primarily for the storing and preserving of fresh vegetables in a moist state. The partition 36 is slightly spaced from the liner to allow for limited air circulation between the food storage compartment 38 and the high humidity compartment 40. An upper door 42 is provided for closing the compartment 34 and a lower door 44 is provided for closing the food storage compartments 38 and 40. These doors 42, 44 may be hung by suitable hinges 46 on the casing reinforcing frame 24 of the cabinet. As shown more clearly in Figs. 2 and 9, the cabinet casing 22 is formed, adjacent the bottom thereof, to provide a machinery compartment 48, immediately behind the high humidity compartment 40.

In the food storage compartment 38, a number of shelves 50 may be supported on rails 52, secured to the sides of the liner 28. In the present cabinet construction, the uppermost shelf extends from the liner rear wall only part way toward the front of the cabinet to provide clearance, forwardly of the shelf for tall articles, bottles, etc. on the shelf below. The narrow shelf may be supported adjacent its forward edge by uprights 54, supported on the shelf, immediately below the uppermost shelf. These shelves 50 are preferably made of an impervious material, such as glass, for the purpose of limiting circulation of air throughout the food storage compartment. Below the lowermost of the shelves 50 is the shelf partition 36 which separates the food storage compartment 38 and the high humidity compartment 40. This shelf partition 36, like the shelves 50, is preferably made of glass for the like purpose of limiting circulation of air between the two compartments. In the high humidity compartment 40, food containers, such as a pair of drawers 56 and a tiltable bin 58 may be provided; the drawers preferably being laterally positioned and spaced above the bin, as shown.

The casing 22 is a box-like structure which may be made of sheet material, such as sheet steel. As shown, the casing has a top wall 60, side walls 62, a rear wall 64 and a bottom wall or cabinet base 66. A lower portion 68 of the casing rear wall 64 is inclined forwardly and downwardly to the casing bottom wall 66 providing a common dividing wall between the high humidity compartment 40 and the machinery compartment 48; a corresponding lower portion of the adjacent liner rear wall being likewise inclined. The casing bottom wall 66 may be formed with upturned reinforcing flanges, including a front flange 70, a rear flange 72 and opposite side flanges 74. Inturned, horizontal flange portions 76, 78 are formed respectively on the front and rear bottom wall flanges 70, 72 for additional reinforcement and to provide seating surfaces. Intermediate the casing bottom wall flanges 70 and 72, the bottom wall 66 is preferably provided with an upwardly directed reinforcing rib 80 which may extend substantially entirely across the width of the casing. Elongated openings 82, 84, adjacent and extending longitudinally of the rib 80 are provided in the casing bottom wall for entrance of air into the machinery compartment 48 for cooling the same. Forwardly of these openings 82, 84, the casing bottom wall 66 may be reinforced, as at 86. A rear portion of the casing bottom wall 66 also serves as a bottom wall of the machinery compartment 48, as shown for example in Figs. 2 and 9.

Figures 13, 14, 15:
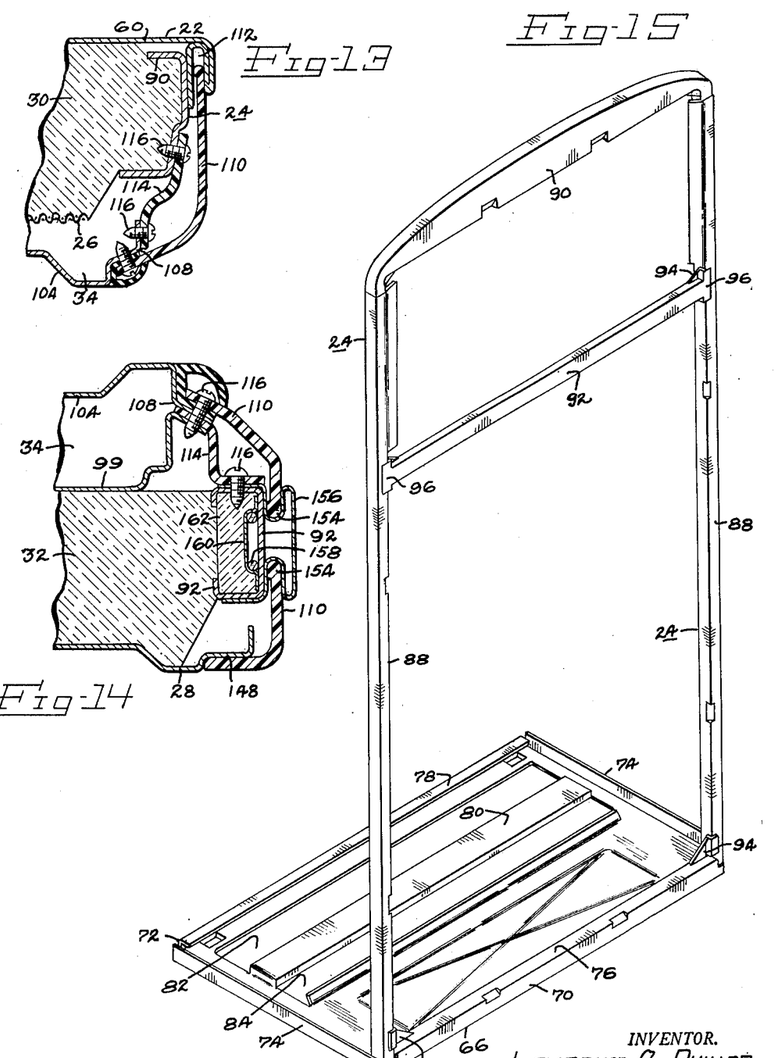
Fig. 15 is an isometric view of cabinet frame structure of the refrigerator.

The upright frame 24 of the cabinet comprises, is general, a pair of laterally spaced upright members 88, a top cross member 90 and a lower cross member 92. The uprights 88 seat at their lower ends on the casing bottom wall or base 66, respectively at the front corners thereof, formed by the flanges 70 and 72. Preferably, the frame uprights 88 are of channel section for strength and rigidity and are welded to the base flanges 70 and 74 and to the casing sides 62. In addition, angle members or gussets 94 may be welded to the bottom wall flange 70 and to the frame uprights 88 to brace the frame members. The top cross member 90 of the frame 24 may be of channel section having downturned ends which may be butt welded or be otherwise secured to the upper ends of the frame uprights 88. Also, the frame cross member 92 may be of channel section and may have extended T-shape ends 96 secured, such as by welding, to the frame uprights 88. This cross member 92 is disposed just forwardly of the insulation partition 32 between the compartments 34 and 36 to reinforce the frame and casing structure in this region. It will be seen that the upright frame 24 and the casing bottom wall or base 66 of the cabinet comprises an L-shape supporting structure which together with the casing walls form a rigid cabinet structure.

The refrigerating apparatus, in the present instance, is of the so-called primary-secondary type, although it will be understood that other two temperature systems may be used with the present refrigerator cabinet if desired. The primary system comprises, in general, a refrigerant evaporator 98, a refrigerant motor-compressor unit 100 and a refrigerant condenser 102. As shown in the drawings, the evaporator 98 is disposed within the cabinet compartment 34, supported by the top wall of the liner 30 and by the frame 24. This evaporator 98 may comprise a sheet metal container 104 and an evaporator coil or conduit 106. Preferably, the evaporator coil 106 is wrapped or wound about the container 104 in contact with the top, bottom and sides thereof for good, heat transfer efficiency. Flanged U clamps 107 may be used to clamp the evaporator coil 106 to the container top, bottom and side walls, the flanges of the clamps preferably being welded to the container. The container 104 is of box-like shape and is preferably of a size to occupy substantially the entire compartment 34 of the cabinet. An out-turned flange 108 is provided on and around the front edge of the evaporator container 104 to receive and overlap with heat breaker strips 110 which close the spaces between the evaporator and the casing at the front of the cabinet. Outer marginal portions of the breaker strips 110 engage in and are retained by channels 112 formed on and extending around the front edge of the cabinet casing 22. The casing channel 112 is disposed just forwardly of the casing frame 24 and these parts are preferably welded or otherwise suitably secured together. Spaced tie members 114 are provided for attaching the evaporator 98 at the front thereof to the casing frame 24. These tie members 114, like the breaker strips 110, are preferably made of a low heat conducting material, such as a phenolic plastic. Self threading or sheet metal screws 116 may be used for securing the tie members 114 to the evaporator flange 108 and to the frame 24. Adjacent the rear of the evaporator 98, brackets 118 are secured to the underside thereof to support and secure the evaporator to the upper ends of a pair of laterally spaced supporting members 120 carried by the top wall of the liner 30; the supporting members preferably being made of a low heat conducting material such as phenolic plastic. Immediately beneath the evaporator 98, a pan 99 is provided which I arrange to serve, among other functions, as a drip receiver during the defrosting periods of the system. Like the evaporator 98, the pan 99 is supported at its rear edge by the spacers 120. The evaporator supports 120 extend upwardly from the top wall of the liner 28 through the insulation 32 to engage the underside of the drip pan 99 and the brackets 118 may be secured to the supports and to the drip pan by screws 124 or by other suitable means.

In the container of the evaporator 98, foods to be frozen or preserved at low temperature, ice trays etc. (not shown) may be stored. Because of the low temperature maintained by this freezing evaporator 98, I provide the insulation spacer 26 of openwork material, such as wire screening, so as to allow moisture laden air, which leaks into the cabinet through unsealed casing joints and through the door latch clearance aperture, to pass freely by diffusion through the interstices of the screening into the freezing compartment where the moisture will freeze out on the evaporator 98 instead of collecting as frost in the insulation and decreasing the effectiveness thereof. The screen spacer 26 has a top, sides and back; the sides and back extending down into the drip pan 99 which has the additional functions of supporting the screening and forming the bottom wall of the evaporator compartment 34. While I prefer to use a wire mesh-like spacer, it will be understood that one or more retainer strips or a usual type liner provided with apertures therein may be employed with substantially the same degree of effectiveness.

The freezing compartment door 42 comprises, a dish-like front casing 130, and an inner panel 132. The casing 130 and the panel 132 together form a closed, door shell in which heat insulation 144 is provided to decrease the rate of heat leakage through the door into the cabinet. Around its outer edge, the door casing 130 may be provided with an inturned flange 134 to reinforce the same and to provide a seating surface for the panel 132 and for a door gasket 138, the flange 134 preferably being reinforced by a frame member 139 welded or otherwise suitably secured thereto. The gasket 138 may be made of rubber or other suitably displaceable gasket material and is arranged on the door in position to engage the outer surface of the casing channels 112. Preferably, the door gasket 138 is of channel cross section to receive an outer marginal portion of the door panel 132 to support the same; the gasket 138 being securable to the panel flange 134 by screws (not shown) or by other suitable securing means. In the present construction, the door panel 132 is formed with a central portion 140 thereof projecting inwardly into the evaporator opening defined by the breaker strips 110. This panel 132 is preferably made of a low heat conducting material, such as phenolic plastic. Because of the low temperature of the freezing evaporator 98, some frost will collect within the door 42 due to condensation of moisture carried by warm room air which leaks into the door through the latch clearance aperture when the door is open. In order to insure removal of condensate from within the door on defrosting of the system, I provide an openwork spacer 142, preferably wire screening to space the insulation 144 from the inner surface of the central projecting portion 140 of the door so that moisture laden room air may pass through the interstices of this spacer and collect as frost on and near the inner surface of the central panel portion 140. By concentrating the frost on and near the central portion 140 condensate will flow down the inner surface of the panel. Adjacent the bottom of the panel 140, a drain aperture 145 is provided for draining the condensate out of the door. Forwardly and overlying this aperture 145, I provide a baffle 146 to prevent flow of the condensate into the insulation. The spacer 142 is formed with projections 147 to engage the door panel so that a large portion of the spacer is positioned slightly forwardly of the door panel. This provides insulation free spaces for the collection of moisture and formation of frost on the inner surface of the door panel portion 140. Also, the above mentioned space allows for free running of the condensate down the inner surface of the door on defrosting of the system. The baffle 146 extends entirely across the width of the door and may have a lower marginal portion gripped and held between the inner and outer secured together door flanges. Along its upper edge, the baffle member 146 may be attached to the spacer member or screen 142 by cement or by other suitable means. The screen 142 may be made of sufficiently strong and flexible wire such that it can be pressed into the panel projection 140 and held in place by friction with the annular wall thereof and by pressure thereagainst of the insulation 144 which tends to expand.

Figures 1, 2, 7:
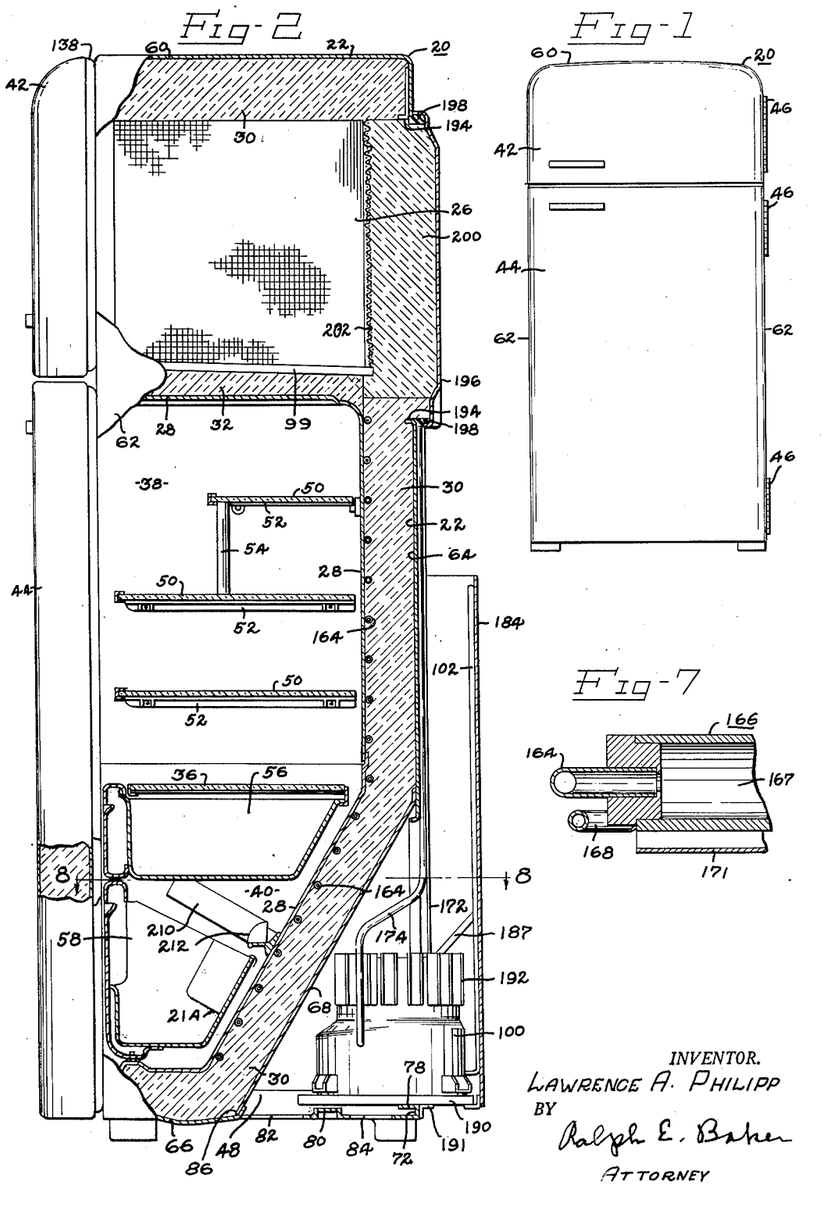
Fig. 1 is a front view of a household type of refrigerator embodying features of my invention.
Fig. 2 is a vertical sectional view of the refrigerator.
Fig. 7 is a fragmentary sectional view of a detail of the refrigerator, taken along the line 7—7 of Fig. 6.
Figure 4:
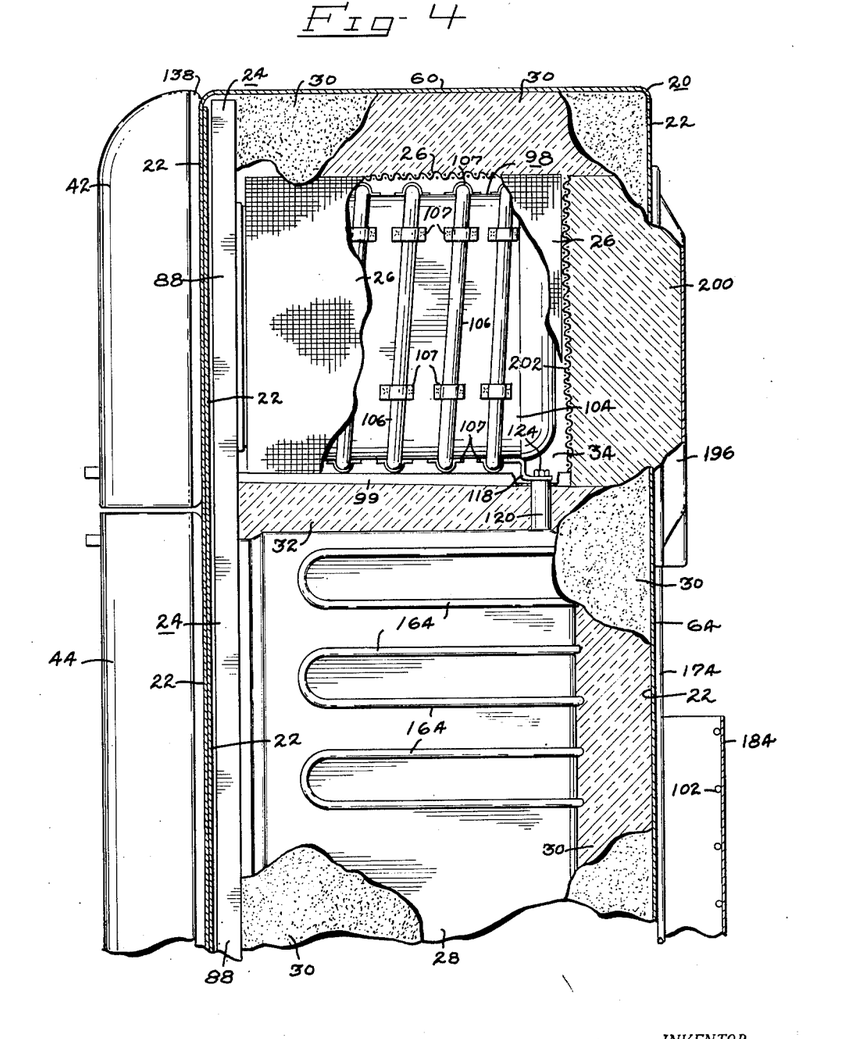
Fig. 4 is a fragmentary, vertical sectional view having parts broken away of an upper portion of the refrigerator.
Figure 5:
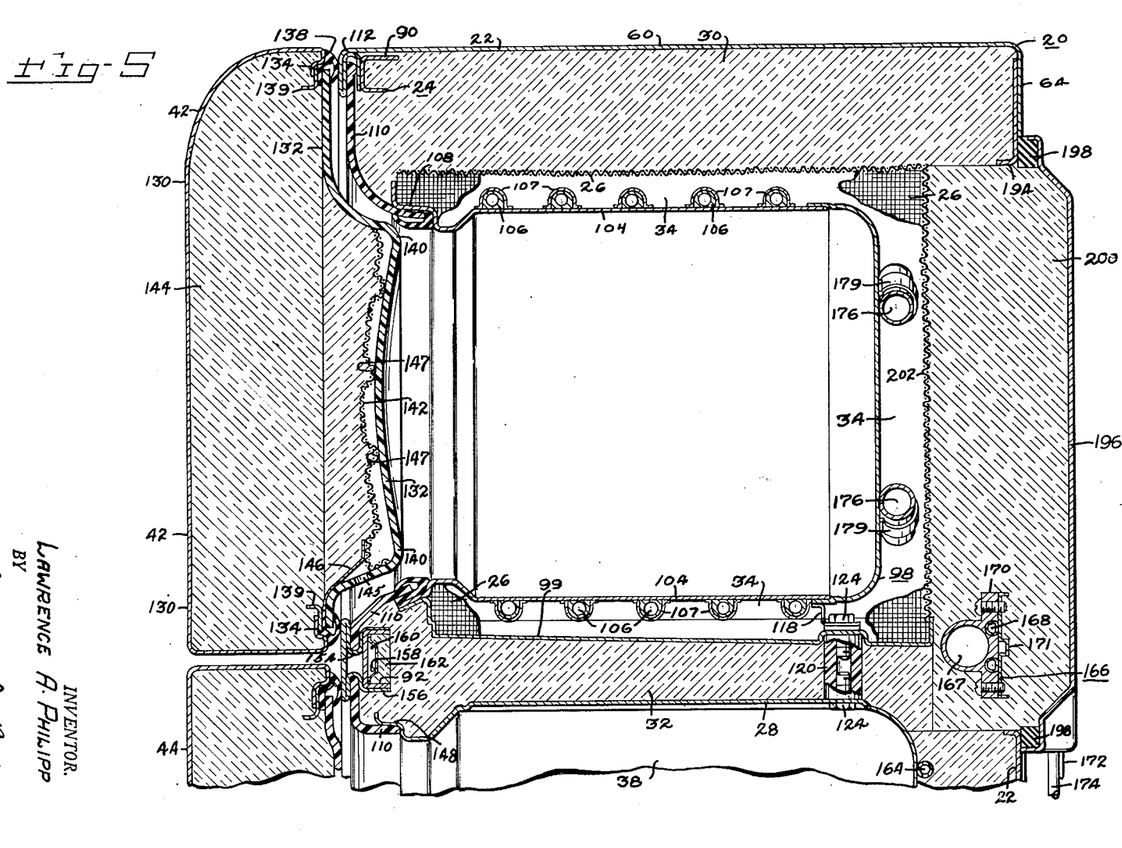
Fig. 5 is an enlarged, fragmentary sectional view of an upper portion of the refrigerator, taken along the line 5—5 of Fig. 3.

Like the evaporator container 104, the food storage compartment liner 28 is preferably provided with an outturned flange 148 for connection by spaced tie members 150 to the frame 24 and to the base flange 70. Also, the liner 28 may be attached at its corners to the frame lower gussets 94 and to similar gussets formed on the intermediate cross member 92 of the frame by screws or by other suitable means. The heat breaker strips 110 close the openings between the front edges of the liner 28 and the casing 26; the breaker strips being held by screws 152 to the liner flange 148 and having outer portions retained in the channels 112 of the cabinet casing. With particular reference to Fig. 5, it will be seen that the breaker strips 110 at the front edge of the partition 32, engage in retainer channels 154 immediately forward of the frame cross member 92. These channels 154 are formed in the top and bottom edges of a finish strip 156 which is secured to and covers the frame cross member 92. In order to prevent condensation occurring on the outer surface of the finish strip 34, I provide a heating element 158 to keep the temperature of the finish strip, and other parts in the region, above the temperaure at which condensation might take place. The heating element 158 is preferably an electrical resistance wire which may be connected in the electric circuit of the compressor motor such that the unit will be energized at all times that the refrigerator is in use or is plugged in to a source of power. I locate the heater 158 within the frame cross member 92 and extend it substantially entirely coextensive of the width of the frame so that the finish strip 156 will be affected over its entire length by the heating element 158. The heating element 158 may be held in place against the inner surface of the cross member web by a smaller channel retainer 160 secured therein. Preferably, insulating material 162 is provided in the cross member 92 behind the heater 158 so as to direct the heat toward the finish strip 156 and adjacent associated parts, away from the interior of the cabinet.

Figure 6:
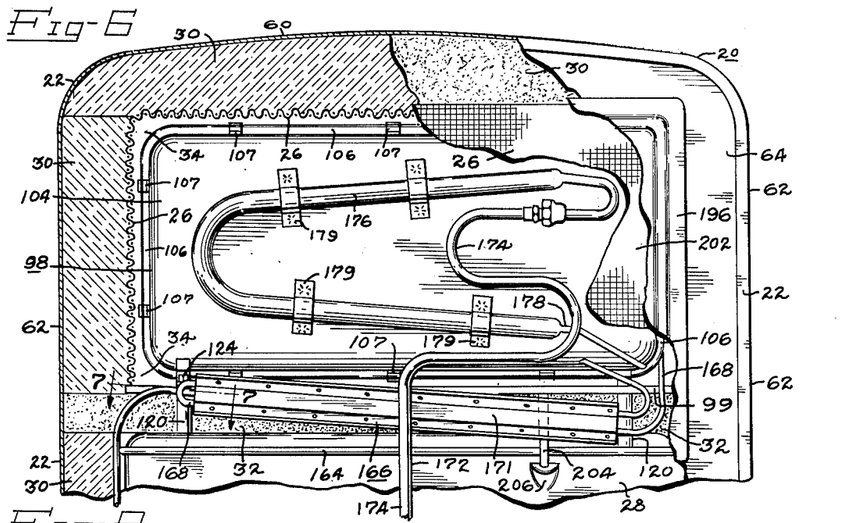
Fig. 6 is a fragmentary rear view having parts broken away and in section of an upper portion of the refrigerator.
Figure 8:
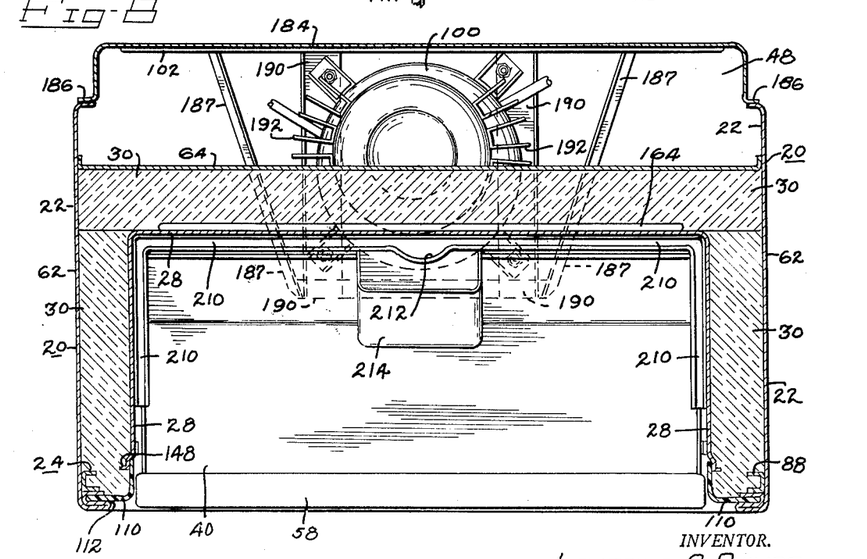
Fig. 8 is a horizontal cross sectional view of the refrigerator, taken along the line 8—8 of Fig. 2.
Figure 9:
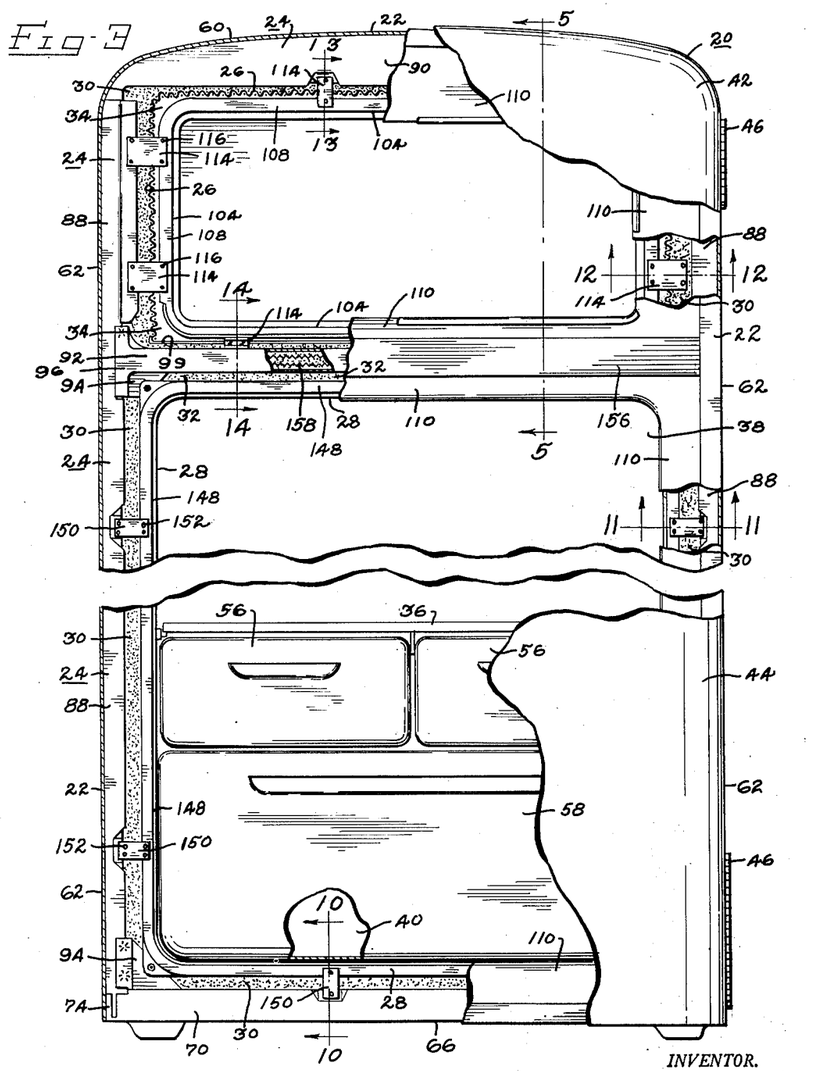
Fig. 9 is a fragmentary, vertical sectional view of a lower portion of the refrigerator.
Figures 9, 11:
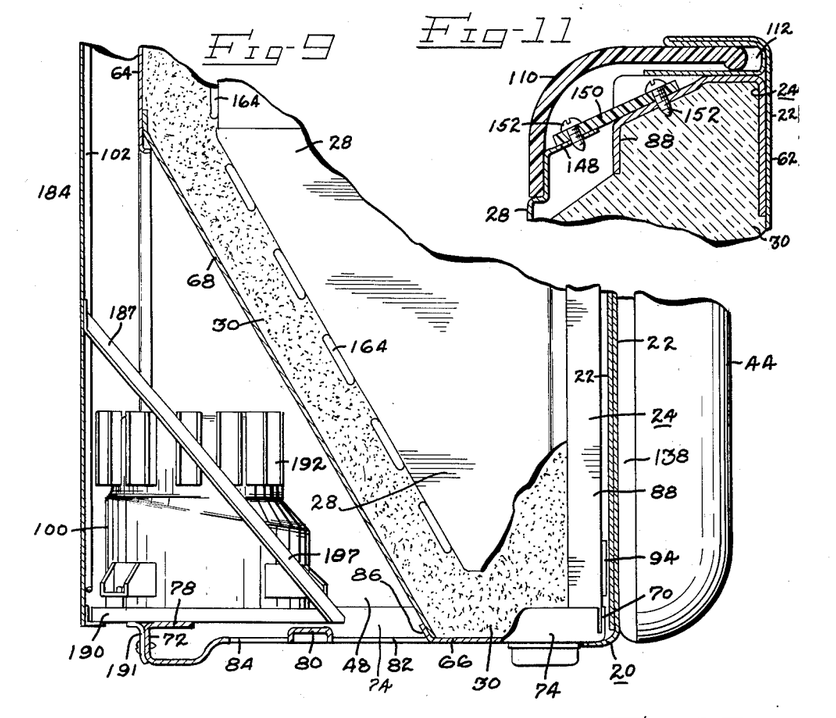
Figs. 10, 11, 12, 13 and 14 are fragmentary cross sectional views of the refrigerator, taken respectively along the lines 10—10, 11—11, 12—12, 13—13 and 14—14 of Fig. 3.
Figure 10:
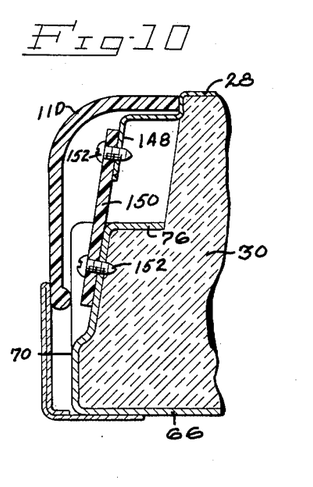
Figure 12:
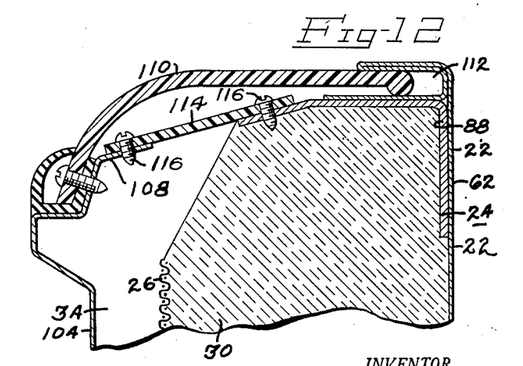
Figure 16:
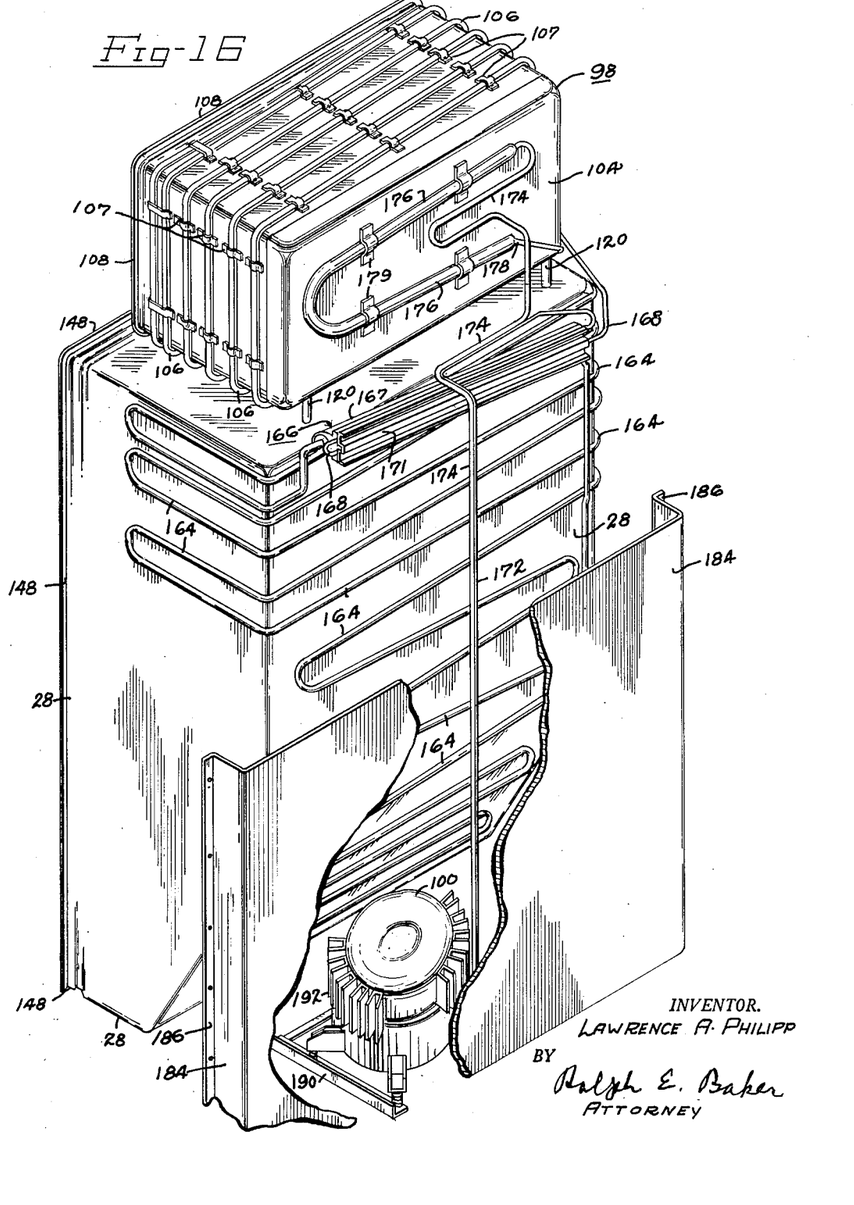
Fig. 16 is an isometric view of units of the refrigerator including the refrigerating system.
Figures 17, 22, 23:
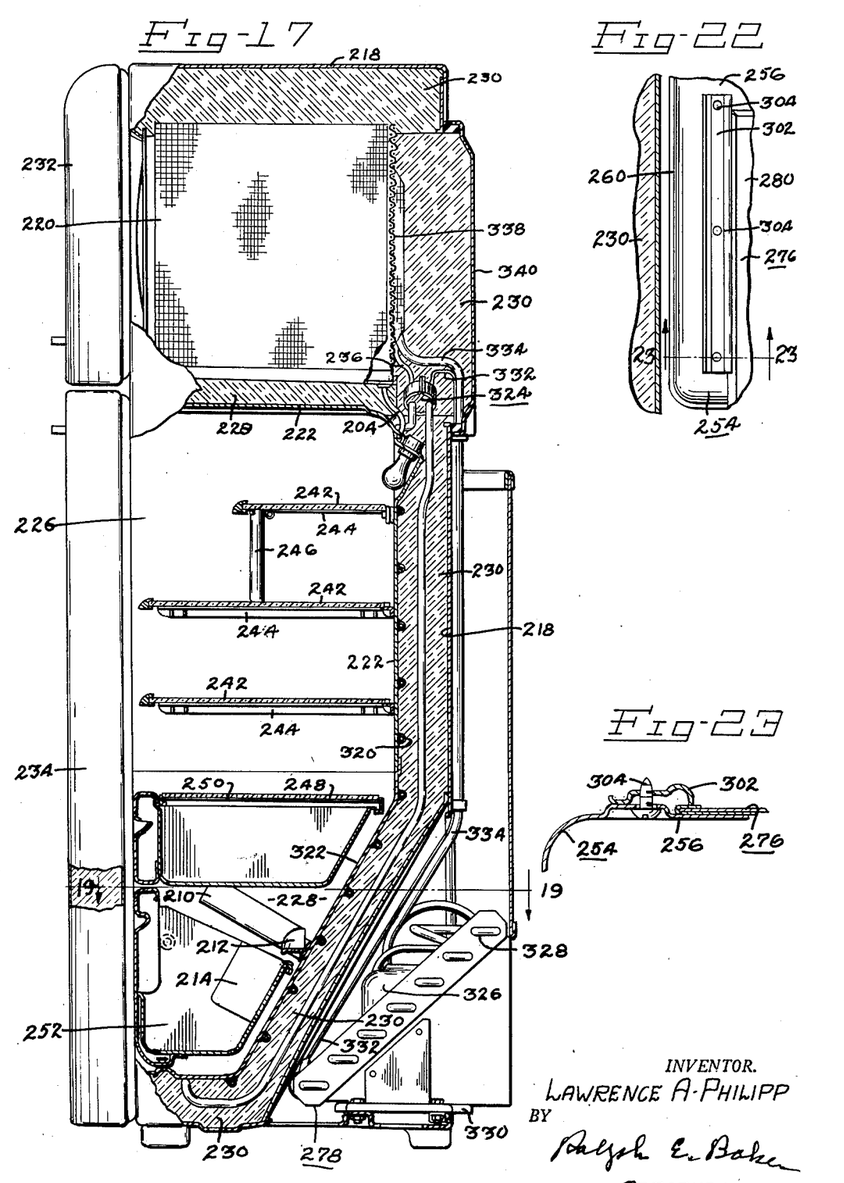
Fig. 17 is a view similar to Fig. 2 showing a modified form of the refrigerator.
Fig. 22 is a fragmentary, horizontal sectional view of the refrigerator, taken along the line 22—22 of Fig. 18.
Fig. 23 is a detailed sectional view, taken along the line 23—23 of Fig. 22.
Figure 18:
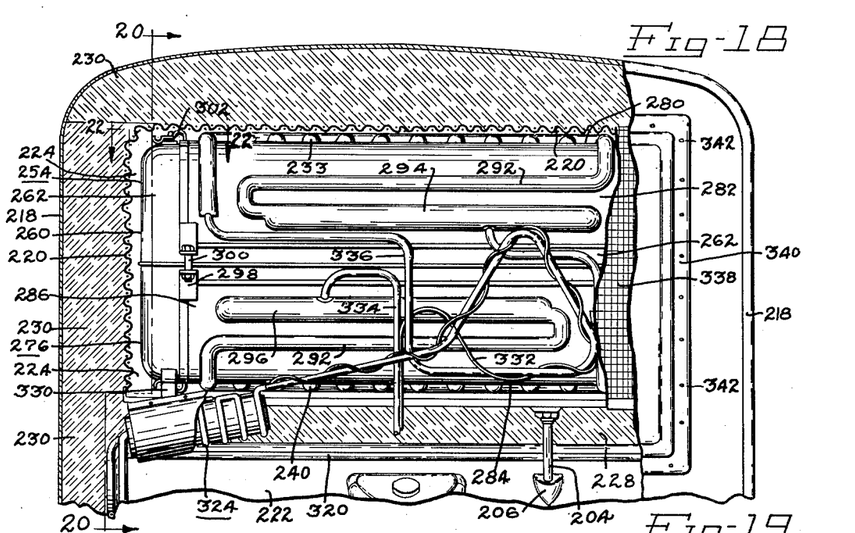
Fig. 18 is a rear view of the modification, having parts broken away and in section.
Figure 19:
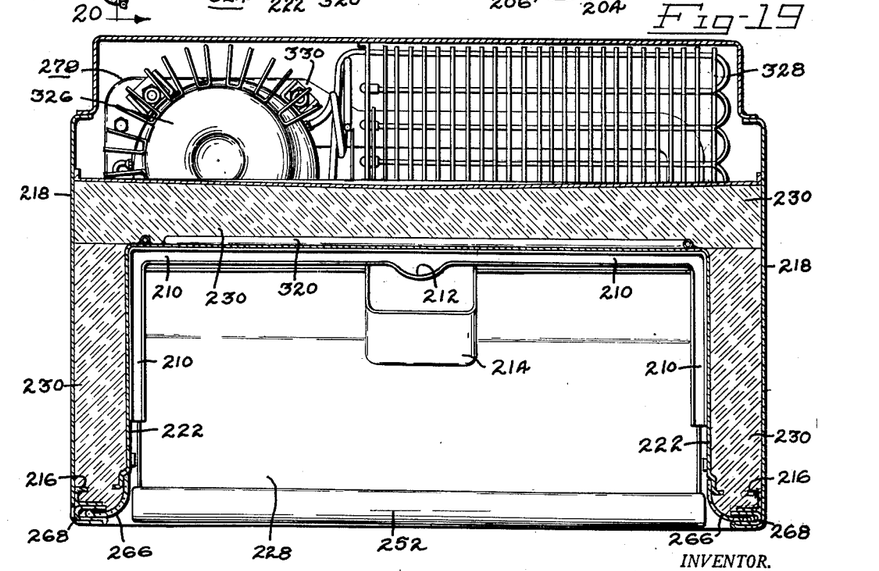
Fig. 19 is a horizontal, cross sectional view of the modified refrigerator, taken along the line 19—19 of Fig. 17.

The secondary refrigerating system comprises, a refrigerant evaporator 164 for cooling the food storage and high humidity compartments, and a heat exchanger 166 for operatively connecting the secondary evaporator to the primary refrigerating system. The evaporator 164, preferably in the form of a sinuous coil, is arranged to extend along the rear wall of the food storage compartment liner 28 and at the top of the liner is arranged to extend partly along the liner sides as best illustrated in Fig. 16. By this arrangement, the upper portion of the liner 28 is refrigerated to a lower temperature than the lower portion, since the lower portion has the coil only on the rear wall of the liner. The heat exchanger 166 is located adjacent the top of the liner 28 and rearwardly thereof; the heat exchanger being embedded in the cabinet rear wall insulation as best shown in Fig. 5. The heat exchanger 166 comprises, in general, an elongated refrigerant container 167 and a refrigerant conduit 168. As shown in Figs. 6 and 16, the heat exchanger container 167 extends across the cabinet rear wall substantially coextensive with the freezing evaporator 98 and is disposed on a slight angle to the horizontal to induce refrigerant circulation in one direction. Preferably the container 166 is a casting having a flange 170 which may be provided with elongated recesses to receive the conduit 168 so as to effect efficient heat transfer relationship between the parts. A clamp 171 may be held by screws to the casting flange 170 to hold the conduit 168 to the casting against the wall surfaces of the conduit receiving grooves.

Liquid refrigerant is supplied from the condenser 102 through a capillary tube 172 to the primary refrigerating system evaporator 98 and returns to the compressor 100 through a return conduit 174. A portion of the capillary tube 172 may be fastened to the return conduit 174 so as to cool the refrigerant en route to the primary system evaporator from the condenser. The return conduit 174 is connected to the upper end of a refrigerant accumulator 176; the lower end of the accumulator 176 being connected to the outer end, as at 178, of the evaporator coil 106. A length of conduit may be used as the accumulator and be secured to the rear wall of the evaporator 94 by clamps 179 or by other suitable means. The accumulator or conduit 176 extends as a refrigerant passage or duct from an upper inlet end thereof downwardly and across the rear wall of the evaporator and is bent to return to the outlet 178 of the evaporator. From the rear of the cabinet, the accumulator has the form of a U on its sides with the sides diverging. Prior to passage of the refrigerant to the evaporator coil 106, the refrigerant passes through the heat exchanger tube 168, absorbing heat from the refrigerant in the larger heat exchanger container 167 or secondary portion of the system. This container 167 is connected at its opposite ends respectively to opposite ends of the secondary system evaporator 164. Thus, heat is absorbed from the liner 28 by the refrigerant in the evaporator 164 and is given up at the heat exchanger to the primary refrigerating system for ultimate dissipation by the condenser 102 thereof.

The condenser 102 is secured to the inner surface of a flue or stack member 184 which is provided behind the machinery compartment 48 to induce upward flow of air therethrough. Preferably, the flue member 184 is made of sheet metal having inturned side flanges, outwardly bent, as at 186, to receive screws or other suitable means for securing the flue member to the casing rear wall. The condenser 102 may be bent and arranged to extend sinuously over a large part of the flue member area to utilize the same for efficient dissipation of the heat of condensation to atmosphere. Any suitable cement or other securing means may be used to secure the condenser 102 in intimate heat relationship with the inner wall surface of the flue member.

Carried by and at the lower edge of the flue member 184 is a horizontal base 190 for supporting the motor-compressor unit 100 so that the motor-compressor and flue member 184 may be removed as a unit from the cabinet. Angle member supports 187 attached to the forward edge of the base 100, secure the base to the flue member 184. The motor-compressor unit 100 is also supported on the rear flange 79 of the cabinet bottom wall or base, the motor-compressor base being secured by brackets 191 to the cabinet base. To aid further in dissipating heat from the primary system, a number of channel-like fins 192 may be provided and be secured with their channel webs flat against the upper portion of the motor-compressor casing so that the channel sides or fins project substantially radially.

The freezing evaporator 98 is removable as a unit from the cabinet, through an opening 194 in the casing rear wall, adjacent the top thereof. Normally, the opening 194 is closed by a closure panel 196 which may be held in place by screws (not shown) or by other suitable means. A gasket 198 of rubber or other suitable displaceable resilient material may be provided between the closure member 196 and the casing rear wall. After the closure panel 196 is removed, a section 200 of the cabinet insulation containing the heat exchanger 166 is removed and then a rear section 202 of the screen liner is removed after which the evaporator may be removed from the cabinet.

A drain pipe 204 leads from the bottom of the drip pan 99 downwardly through the insulation to empty into a recess 206 provided in the rear wall of the liner 28. On defrosting of the system, water flows down the liner inner surfaces into a channel section trough 210 secured to the liner in the high humidity compartment 40. The trough 210 is provided with a spout or lip 212 directed to empty the water into a removable container 214 which may be hung on the rear wall of the vegetable bin 58 beneath the spout 212.

Referring now to the modification shown in Figs. 17 to 24 inclusive, the cabinet shown comprises, in general, a frame 216, a sheet metal casing 218, a liner member or spacer 220, and a liner member or shell 222. The liner 220 forms an upper freezing compartment 224 and the liner 222 forms an intermediate temperature, food storage compartment 226, and a high temperature, high humidity compartment 228. Between the bottom and top walls respectively of the liners 220, 222 insulation 228 is provided and arranged to form a horizontal partition between the liners. Also, insulation 230 is provided between the liners and the casing 218 to decrease heat leakage into the interior of the cabinet. Any suitable well-known type of heat insulation may be used. At the front of the cabinet, an upper door 232 is provided for closing the access opening to the freezing compartment 224 and a lower door 234 is provided for closing the access opening to compartments 226 and 228. These doors 232, 234 may be hung on one side of the cabinet by suitable hinges (not shown). The freezing compartment door 232 includes an inner panel 238 which is formed with a centrally located projection 240 which extends into the freezing compartment having a concavo-convex end wall 244.

In the food storage compartment 226, a number of shelves 242 may be supported on rails 244 secured to the sides of the liner 222. In the present cabinet, as in the previously described cabinet, the uppermost of the shelves 242 extends from the liner rear wall only partway toward the front of the cabinet to provide clearance, forwardly of this shelf for tall articles, bottles, etc. on the shelf below. The narrow shelf may be supported adjacent its forward edge by uprights 246, resting on the shelf immediately below the uppermost shelf. These shelves 242 are preferably made of an impervious material, such as glass, for the purpose of limiting circulation of air throughout the food storage compartment. Below the lowermost of the shelves 242 is a shelf-partition 248 which separates the food storage compartment 226 and the high humidity compartment 228. This shelf partition 248, like the shelves 242, is preferably made of glass for the like purpose of limiting circulation of air between the two compartments. In the high humidity compartment 228 food containers, such as a pair of drawers 250 and a bin 252 may be provided; the drawers preferably being laterally positioned and spaced above the bin, as shown.

Within the freezing compartment 224, I provide a storage compartment forming container 254. The container 254 is preferably box-shaped having a top wall 256, bottom wall 258, end walls 260 and a rear wall 262. These walls are spaced from the corresponding walls of the liner 220 to decrease heat exchange by conduction therebetween and to prevent, among other things, formation of frost and resulting wetting of the cabinet wall insulation. At the front of the container 254 outturned flanges 264 of the container top, bottom and sides receive and overlap with inner marginal portions of heat breaker strips 266. These breaker strips 266 have outer marginal portions thereof engaging in channels 268 formed out of the casing around the outer periphery or front thereof. In addition to functioning as heat insulators, between the casing 218 and the liners 220, 222, the breaker strips 266 give a finished appearance to the access openings of the freezing and food storage compartments. To insure against leakage of air into the cabinet insulation at the joints of the breaker strips 266 with the container flange 264, I provide a gasket 270 therebetween. The gasket 270 may be made of any suitable displaceable sealing material, such as rubber, and may be held displaced between the breaker strips and container flange 264 by self threading or sheet metal screws 272. As is shown more clearly in Fig. 20, the projection 240 of the freezing compartment door 232 extends into the access opening defined by the breaker or finish strips 266. This projection 240 is formed with curved top, bottom and side walls 274 which in cooperation with the curved breaker strips forms a throat to decrease cold air passing therethrough and consequently to decrease condensation on front surfaces of the cabinet inwardly of the door gasket. Also, the gasket 222 functions to decrease the flow area of said throat, thus aiding in decreasing passage of cold air therethrough.

The freezing compartment storage container 254 is refrigerated by a refrigerant evaporator 276 of a primary refrigerating system which includes a refrigerant condensing element, designated generally by the numeral 278. In order to refrigerate the container 254 efficiently and at the same time provide for removability of the evaporator 276 from the cabinet, I make the evaporator of U-shape in cross section to fit over or receive the container 254. To insure further for efficient heat transfer relationship between the evaporator 276 and the container 254, I make the U-shape evaporator of two L-shaped parts and clamp these parts together and to the top and rear walls of the container. The upper L-shaped part of the evaporator comprises a relatively long leg 280 which lies flat against the upper surface of the container top wall 256 and a relatively short leg 282 which lies flat against the outer upper surface of the container rear wall 262. Similarly, the lower L-shaped part of the evaporator 276 has a relatively long, sheet metal leg 284 engaging flat against the underside of the container 254 and has a relatively short, sheet metal leg 286 engaging flat against the lower exterior surface of the container rear wall 258. These L-shaped evaporator parts or units are formed having sinuous refrigerant passages 233, 240 extending respectively along the upper and lower walls or legs 280 and 284 of the evaporator 276. Connecting passages 292 formed in the rear walls or legs 282 and 286 of the evaporator include a refrigerant header 294 and a refrigerant accumulator 296. Welded or otherwise suitably secured to the adjacent evaporator legs 282 and 286 are L-shaped clamp members 298 which may be drawn together by nuts and bolts 300 to hold the L-shaped parts of the evaporator tightly against the opposite surfaces of the container 254. Additional clamps 302 are provided to clamp the upper and lower evaporator legs 280, 284 flat against the container 254 to insure good surface contact therebetween for efficient heat exchange relationship. The clamps 302 may be elongated strips arranged to overlap and engage outer marginal portions of the side edges of the evaporator legs 280 as shown, for example, in Figs. 22, 23. These clamping strips 302 may be made of spring metal and may be drawn down to the container top walls 256 by self threading or sheet metal screws 304.

Figures 20, 21:
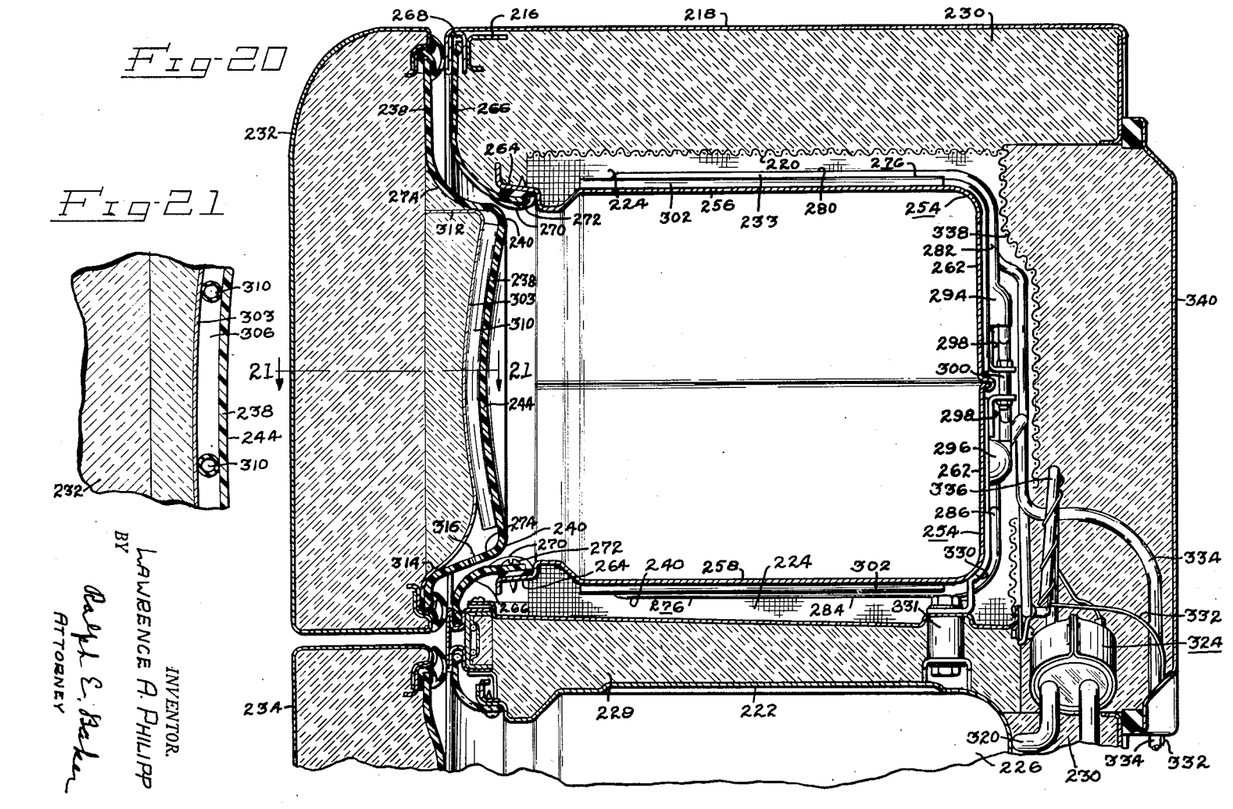
Fig. 20 is an enlarged, vertical sectional view of an upper portion of the refrigerator taken along the line 20—20 of Fig. 18.
Fig. 21 is a cross sectional view of the refrigerator, taken along the line 21—21 of Fig. 20.
Figure 24:
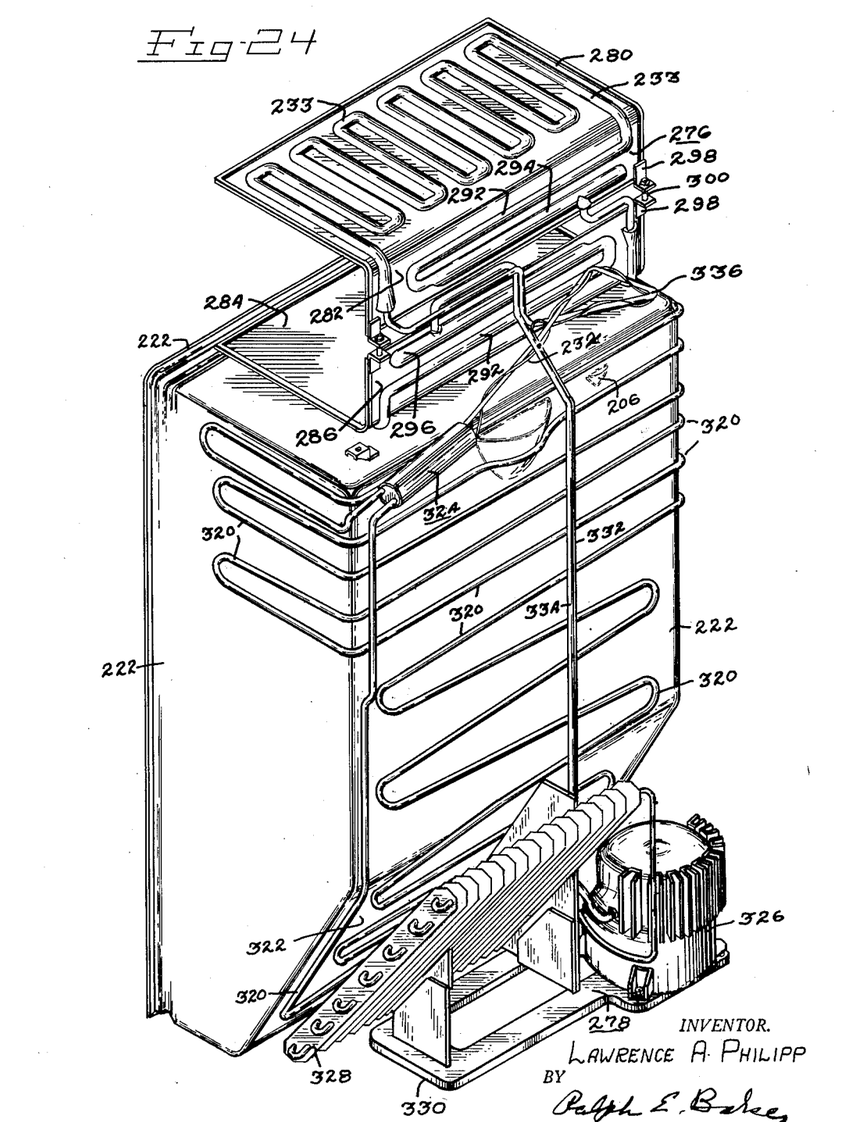
Fig. 24 is an isometric view similar to Fig. 16 showing the refrigerator units including the refrigerating system.

In order to prevent decreasing the efficiency of the door insulation by collection of frost therein due to the low temperature and close proximity of the freezing evaporator 276, I provide a frost collection space 306 in the door separated from the insulation by a spacer panel 303 in the central projection 240 of the door. The spacer panel 303 is made of a heat reflecting material, preferably aluminum foil and is preferably spaced from the inner surface of panel projection end wall 240 by vertically extending horizontally spaced tubes 310. These spacer tubes 310 may be made of rubber and may be held in place by the aluminum foil spacer 303 and by the expansion force of the door insulation which is preferably fiber glass. The aluminum foil panel 303 may have end flanges, a top flange 312 and a bottom flange 314 which flanges fit into the recess of the door panel extension portion 240. As shown in Fig. 20, the aluminum foil panel 303 and the rubber spacer tubes 310 conform to the convex inner surface of the door inner panel. A lower marginal portion of the aluminum foil panel flange 314 curves forwardly and downwardly to engage and be held between the secured together flanges of the door casing and its rear panel 238. The aluminum foil panel flange serves also as a baffle so that on defrosting of the system water will drain from the door through one or more drain apertures 316 provided in the lower flange of the door panel recess.

A refrigerant evaporator 320 of a secondary system is provided to cool the food storage compartments 226, 228 by absorbing heat from the liner 222 of the compartments. As shown, the evaporator 320 is preferably of the coil or conduit type and is arranged in engagement with the outer surface of the liner 222. Cement or other suitable means may be provided for securing the evaporator coil 320 to the liner 222 in good heat exchange relationship therewith. Adjacent the bottom of the cabinet liner 222, the rear wall thereof has a forwardly and downwardly inclined portion 322 beneath which the condensing element 278 is disposed. Attached to the inclined portion 322 of the liner 222, the evaporator coil 320 extends upwardly across the back of the liner and also extends along portions of the liner opposite sides adjacent the top of the liner (see Fig. 24). The evaporator coil 320 comprises, a secondary refrigerating system which is in heat exchange relationship with the primary system by means of a heat exchanger or evaporator 324. Any suitable type of heat exchanger may be used such as the type hereinbefore described in the preferred embodiment or the type shown in my Patent No. 2,361,792. As is well known, in primary-secondary systems, the heat exchanger functions to condense and absorb heat in the secondary system, the heat absorbed ultimately being dissipated by the primary system condensing element. The heat exchanger or evaporator 324 may be located in the cabinet rear wall and may be embedded in the insulation, as shown.

The condensing element 278 in the present refrigerator comprises, a motor-compressor unit 326, and a finned condenser coil 328. These units are mounted on a supporting base 330 which in turn may be bolted to the base of the cabinet behind the inclined wall 322. Refrigerant is delivered by the condenser 328 to the evaporator 276 through a small diameter or capillary tube 332 which, as is well known, functions to supply proper amounts of refrigerant to the evaporator to maintain desired temperatures. Between the condenser 328 and the evaporator 276 a heat absorbing portion of the capillary tube 332 is arranged in heat exchange relationship with the secondary refrigerating system at the heat exchanger 324. As is shown more clearly in Fig. 24, the portion of the capillary tube 332 between the condenser 328 and the heat exchanger 324 is arranged in good heat transfer relationship with a refrigerant return conduit 334 of the primary system for the purpose of cooling the liquid refrigerant en route to the freezing evaporator 276. From the heat exchanger 324, a refrigerant supply conduit 336 of larger flow capacity than the capillary tube 332 delivers refrigerant to the inlet of the evaporator passage 288 for passage therethrough; the gaseous refrigerant being withdrawn from the refrigerant accumulator 296 for return to the condensing element through the return conduit 334.

The arrangement for draining and collecting water from the freezing evaporator 276 on defrosting of the system is the same as that described in connection with the refrigerator of Figs. 1 to 16 and therefore like parts are designated by like numerals.

In the rear wall of the cabinet, the freezing compartment liner 220 is provided with a removable rear wall or closure member 338, immediately behind the evaporator 276. Similarly, the cabinet casing 218 is provided with a removable panel or closure member 340 which may be attached to the cabinet by screws 342 or by other suitable means. Upon removing these closure members 338 and 340 together with the insulation therebetween, access may be had to the rear of the evaporator 276 for the purpose of removing the evaporator from the cabinet through the back thereof. To remove the evaporator 276, clamps 302 are loosened; access to the screws 304 holding the clamps being had through the access opening closed by the door 232. Also, the clamps 298 at the back of the evaporator 276 are loosened or released after which the evaporator may be pulled rearwardly from the container 254 out of the cabinet. The container 254 and the evaporator 276, carried thereby, are supported by the top wall of the cabinet liner 222; the container 254 being directly mounted on brackets 330, located at the rear of the freezing compartment, as shown in Fig. 20. These brackets 330 seat on and are secured to spacers 331 which in turn are supported on and are secured to the top wall of the liner 222. It will be seen that the container 254 extends beyond the side edges of the evaporator 276 and that the brackets 330 are located just outwardly of the evaporator edges for clearance by the evaporator 276 when the evaporator is pulled rearwardly from the cabinet.

From the foregoing description it will be noted that I have provided improved refrigerators of a structural character to allow room air, which leaks into the cabinet insulation through the door latch clearance aperture, to pass freely into the cabinet freezing evaporator compartment through the wire mesh and freeze out on the evaporator instead of collecting as frost in and impairing the efficiency of the insulation. Also, I have provided improved freezing compartment doors of a structural character such that collection of frost therein is restricted to a portion of the door which I have constructed so that moisture will drain from the door upon defrosting of the system. It will also be noted that I have provided a refrigerator having a freezing compartment evaporator in good thermal contact with three large surfaces of a storage compartment forming container and have arranged these units together with a freezing compartment liner in a manner such that frost will not be likely to form in the cabinet insulation and such that the evaporator may be readily separated from the container and removed as a unit from the cabinet. In addition, I have provided an efficient primary-secondary type of refrigerator in which the secondary evaporator coil extends entirely along the back of the food storage compartment liner and along the sides thereof adjacent the top of the liner to obtain efficient heat absorbing results. Further, it will be noted that I have provided an improved cabinet structure for supporting cabinet forming members and refrigerating units. It will also be noted that I have provided a structurally improved cabinet which is strong and rigid yet may be light in weight. Furthermore, I have provided a refrigerator cabinet of a structural character which facilitates its assembly, particularly in view of the arrangement for securely supporting the cabinet liners and evaporators on the front wall reinforcing frame.

Although preferred and modified forms have been illustrated, and described in detail, it will be apparent to those skilled in the art that various other modifications may be made therein without departing from the spirit of the invention or from the scope of the appended claims.

I claim:

1. In refrigerating apparatus, a cabinet casing having a compartment and an access opening in a rear wall to the compartment, a removable closure member closing said opening, a cooling element within said compartment, insulation means between said cooling element and said casing, removable insulation means between said cooling element and said removable closure member, said first and second insulation means being pervious to moisture to allow passage thereof from within said casing to said cooling element, wire screening co-operating with said insulation to form top and side walls of said compartment, and a separately removable screen forming the rear wall of said compartment with said removable closure member.

2. In refrigerating apparatus, a cabinet casing having a compartment and an access opening in a rear wall to the compartment, a removable closure member closing said opening, a cooling element within and removable from said compartment through said opening, insulation means between said cooling element and said casing, removable insulation means between said cooling element and said removable closure member, said first and second insulation means being pervious to moisture to allow passage thereof from within said casing to said cooling element, wire screening co-operating with said insulation to form top and side walls of said compartment, a separately removable screen forming the rear wall of said compartment with said removable closure member, and a drip pan forming the bottom wall of said compartment.

3. In refrigerating apparatus, a cabinet casing having a compartment and an access opening thereto in a rear wall of the compartment, a removable closure member closing said opening, a cooling element within said compartment, insulation means between said cooling element and said casing, removable insulation means between said cooling element and said removable closure member, said first and second insulation means being pervious to moisture to allow passage thereof from within said casing to said cooling element, an inverted U-shaped metal screen co-operating with said insulation to form top and side walls of said compartment and held in place by said insulation, a separate metal screen overlying said access opening forming the rear wall of said compartment with said removable insulation means, said separate metal screen being held in place by said removable closure member and being removable through said access opening, and a drip pan forming the bottom wall of said compartment and receiving lower edge portions of said inverted U-shaped screen and said separate screen member.

LAWRENCE A. PHILIPP.

REFERENCES CITED

The following references are of record in the file of this patent:

UNITED STATES PATENTS

| Number | Name | Date |
|---|---|---|
| 1,684,716 | Seeger | Sept. 18, 1928 |
| 2,020,845 | Marshall | Nov. 12, 1935 |
| 2,029,755 | Cohen | Feb. 4, 1936 |
| 2,125,444 | Holderle | Aug. 2, 1938 |
| 2,135,878 | Sekyra | Nov. 8, 1938 |
| 2,192,933 | Saborsky | Mar. 12, 1940 |
| 2,244,005 | Gustin | June 3, 1941 |
| 2,309,533 | Philipp | Jan. 26, 1943 |
| 2,312,326 | Earle | Mar. 2, 1943 |
| 2,317,082 | Philipp | Apr. 20, 1943 |
| 2,328,130 | Earle | Aug. 31, 1943 |
| 2,330,915 | Philipp | Oct. 5, 1943 |
| 2,330,916 | Philipp | Oct. 5, 1943 |
| 2,348,645 | Quinn | May 9, 1944 |
| 2,358,221 | Drake | Sept. 12, 1944 |
| 2,400,634 | Earle | May 21, 1946 |
| 2,410,232 | Pedigo | Oct. 29, 1946 |
| 2,411,461 | Philipp | Nov. 19, 1946 |
| 2,437,414 | Archibald | Mar. 9, 1948 |
| 2,446,686 | Behrens | Aug. 10, 1948 |
| 2,493,488 | Jordan | Jan. 3, 1950 |
| 2,498,379 | Sears | Feb. 21, 1950 |
| 2,509,610 | Philipp | May 30, 1950 |
| 2,515,892 | Philipp | July 18, 1950 |